United States Patent Office 3,392,174
Patented July 9, 1968

3,392,174
STABILIZATION OF PROPIOLACTONES
Gary Plant Hildebrand, Wilmington, Del., assignor to E. I. du Pont de Nemours and Company, Wilmington, Del., a corporation of Delaware
No Drawing. Filed May 31, 1966, Ser. No. 553,702
6 Claims. (Cl. 260—343.9)

This invention relates to the stabilization of propiolactones during their manufacture and storage by incorporating therein a small amount of phosphorous acid or an aqueous solution thereof.

Pivalolactone and chloropivalolactone are useful for conversion to polyesters by polymerization processes known in the art. These polyesters can be used to make fibers and molding resins.

The lactones used to make these fiber-forming resins generally are stored and refined before they can be used. This has been a problem since the propiolactones tend to form dimers, trimers and low polymers and hence, gel on standing, as in storage before their use. This tendency is greatly magnified in refining, which involves distillation. The heat for distillation accelerates the polymerization of the propiolactones.

It has now been found that the incorporation of small amounts of phosphorous acid or an aqueous solution thereof in the propiolactones significantly reduces this polymerization tendency during the storage and distillation periods normally encountered.

Generally, it has been found that from 0.01 to 2.0 percent by weight as based on the propiolactone of phosphorous acid adequately stabilizes the propiolactones at temperatures up to about 150° C., which is adequate for either storage or refining operations.

It has been observed that the presence of water has a synergistic effect on stabilization. Generally, when water is to be used, the phosphorous acid is added as a 30 to 50 percent by weight aqueous solution. Hence the water is present in an amount of from 1:1 to 70:30 as based on the phosphorous acid.

The following examples are illustrative of the invention.

Example I

As a control, a test tube containing a 10 gram sample of pivalolactone is immersed in an oil bath maintained at 100° C. Within 12 hours, the contents of the tube have polymerized to a solid.

The experiment is repeated using 10 g. of pivalolactone containing 0.1 g. of 30 percent aqueous phosphorous acid ($H_3PO_3$). The contents of the tube are fluid after 10 days standing in an open glass test tube in an oil bath maintained at 100° C., with only a small amount of solids observed.

Example II

In the production of pivalolactone from chloropivalic acid, it is necessary to separate the lactone from the unreacted starting material, carboxylic acid by-products, and other impurities. This separation is accomplished by distillation; however, the lactone recovery during this distillation is dependent upon the amount and type of impurities from which it has to be separated. To illustrate this point, in a control run, pivalolactone is heated at 100° C. in the presence of these acidic by-products and impurities in a stainless steel container. The mixture contains 14.0 g. of pivalolactone and 3.8 g. of impurities of which $1.3 \times 10^{-2}$ moles are carboxylic acid. Periodic analyses of the mixture reveals that in 5 hours, 18 percent of the pivalolactone present has polymerized to a higher molecuar weight material.

The run is repeated using an identical quantity of pivalolactone and impurities except for the addition of 0.10 g. of 30 percent aqueous phosphorous acid. The mixture is maintained at 100° C. in a stainless steel container. Periodic analyses indicate that after 5 hours, only 1 percent of the pivalolactone present has polymerized to higher molecular weight material.

Example III

This example illustrates the stabilizing influence of phosphorous acid on an actual distillation.

The distillation is a batch operation employing pot temperatures ranging from ambient to 130° C. and a head pressure from 100 to 5 mm. of Hg over a 12 hour period. The feed material and the amount of material obtained are reported in Table I.

TABLE I

| Compound | Feed to Still, lbs. | Recovered From Still, lbs. | Change, lbs. |
|---|---|---|---|
| Pivalolactone | 139.2 | 115.8 | −23.4 |
| Chloropivalic acid | 7.6 | 0.8 | −6.6 |
| $ClCH_2C(CH_3)_2COOCH_2C(CH_3)_2COOH$ | 16.7 | 8.6 | −8.1 |
| $ClCH_2C(CH_3)_2COOCH_2C(CH_3)_2COOCH_2C(CH_3)_2COOH$ | 9.7 | 18.0 | +8.3 |
| High molecular weight material | Nil | 36.2 | +36.2 |

The pivalolactone loss to higher molecular weight material was found to be 17 percent.

This distillation is repeated using the same conditions with the addition of 3.0 pounds of 40 percent aqueous phosphorous acid. The feed materials and the materials obtained from this distillation are reported in Table II.

TABLE II

| Compound | Feed to Still, lbs. | Recovered From Still, lbs. | Change, lbs. |
|---|---|---|---|
| Pivalolactone | 135.4 | 131.6 | −3.8 |
| Chloropivalic acid | 7.3 | 8.7 | +1.4 |
| $ClCH_2C(CH_3)_2COOCH_2C(CH_3)_2COOH$ | 16.3 | 15.6 | −0.7 |
| $ClCH_2C(CH_3)_2COOCH_2C(CH_3)_2COOCH_2C(CH_3)_2COOH$ | 8.2 | 9.8 | +1.6 |
| High molecular weight material | Nil | 3.4 | +3.4 |

The pivalolactone loss to higher molecular weight material was found to be 3 percent. Hence, the phosphorous acid decreased the pivalolactone loss by a factor of about 5.

Example IV

As a control, a 10 gram sample of chloropivalolactone is placed in an open glass test tube which is immersed in an oil bath maintained at 100° C. Within 5 minutes, polymerization can be observed to begin and the entire contents of the tube are polymerized in 6 hours.

A 10 gram sample of chloropivalolactone to which 0.87 percent phosphorous acid has been added is placed in an open glass test tube which is immersed in an oil bath maintained at 100° C. No polymerization is observed after 6 hours and about 10 percent of the material remains unpolymerized after two days.

Another 10 gram sample of chloropivalolactone to which 1.2 percent of 30 percent aqueous phosphorous acid has been added is placed in an open glass test tube which is immersed in an oil bath maintained at 100° C. No polymerization is observed after 22 hours and about 30 percent of the material remains unpolymerized after three days.

I claim:
1. A composition consisting essentially of a propiolactone and from 0.01 to 2.0 percent as based on said propiolactone of phosphorous acid.
2. The composition of claim 1 which contains water in an amount of from 1:1 to 7:3 as based on the phosphorous acid.
3. The composition of claim 1 wherein the propiolactone is pivalolactone.
4. The composition of claim 1 wherein the propiolactone is chloropivalolactone.
5. The composition of claim 2 wherein the propiolactone is pivalolactone.
6. The composition of claim 2 wherein the propiolactone is chloropivalolactone.

References Cited

UNITED STATES PATENTS 3,227,730  1/1966  Goldsmith et al. _____ 260—343

NICHOLAS S. RIZZO, *Primary Examiner.*

F. A. MIKA, *Assistant Examiner.*